J. R. SYMMES.
Seed-Drill.
No. 164,781.  Patented June 22, 1875.
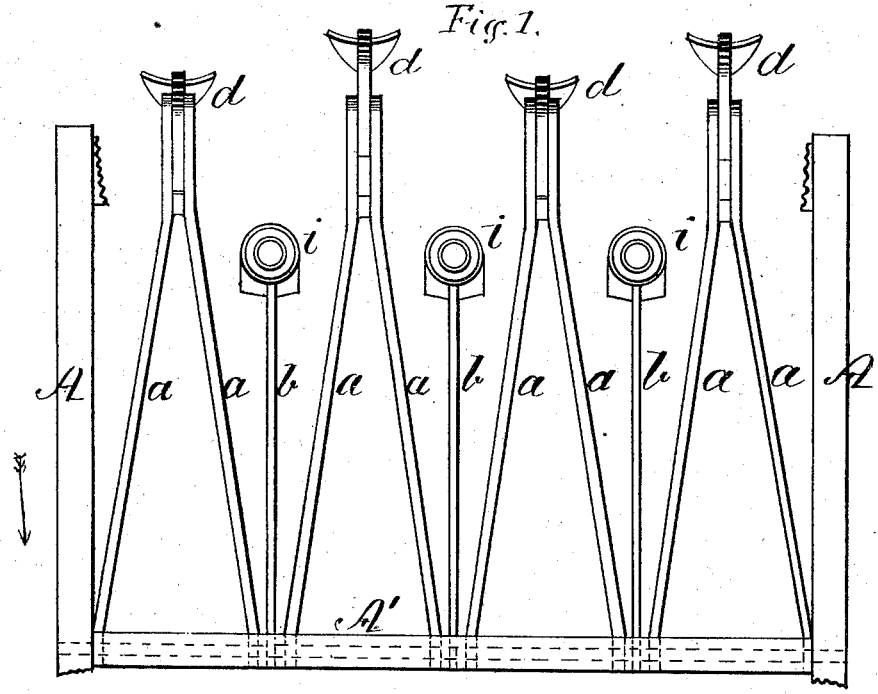
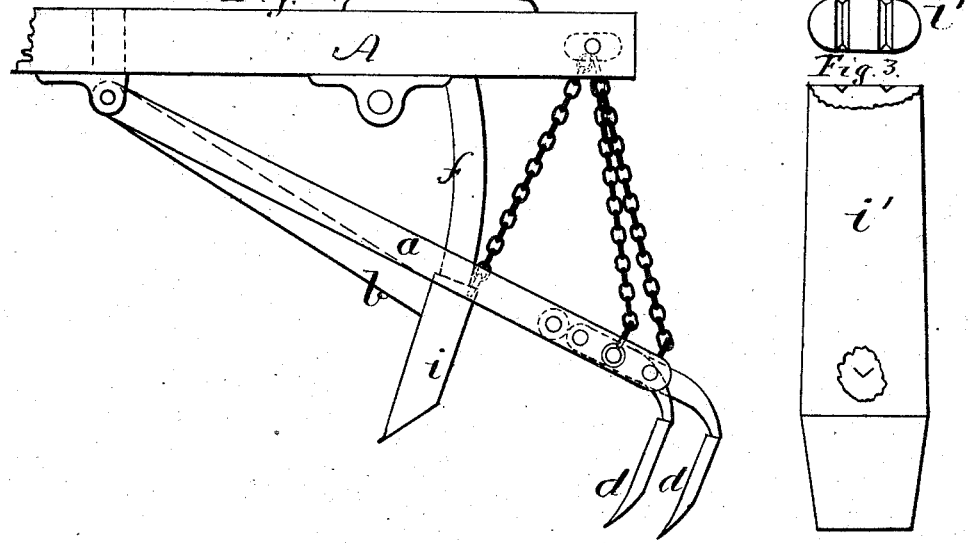
Witnesses:
H. P. K. Peck
James D. Ormiston
P. R. Symmes
Inventor

UNITED STATES PATENT OFFICE.

JOSEPH R. SYMMES, OF HAMILTON, OHIO.

IMPROVEMENT IN SEED-DRILLS.

Specification forming part of Letters Patent No. 164,781, dated June 22, 1875; application filed September 30, 1874.

*To all whom it may concern:*

Be it known that I, JOSEPH R. SYMMES, of Hamilton, in the county of Butler and State of Ohio, have invented a new and useful Improvement in Seed-Drills; and I do hereby declare that the following is a full and exact description of the same, reference being had to the accompanying drawings, and to the letters of reference marked thereon.

Figure 1 represents so much of a horizontal section of my improved seed-drill as to exhibit the position and arrangement of the conducting-hose and plows, and the manner of connecting them with the frame. Fig. 2 represents a side elevation of a part of the frame and the operating parts. Fig. 3 represents one of the metal distributing-tubes, of slightly modified form, with parts broken away.

The grain-drills in most common use are provided with tubular drill-teeth, which open a furrow and conduct the grain below the surface of the ground, depositing it in a narrow row, where it is covered by the displaced earth as the drill-teeth advance, the earth falling upon it and covering it at the bottom of the narrow furrow. When grain is thus sown, the field presents a ridged or corrugated surface, and the seed is slightly covered at the bottom of V-shaped grooves or furrows, between which the ridges are formed by the action of the tubular drill-teeth. Again, when grain-drills have been constructed to cover the grain by side plows, or plows running between the drill-tubes, the office of the said plows has been thus far only to throw back into the previously-opened seed-furrow, the earth turned out therefrom.

My improvement is intended to obviate these objections, by first sowing the seed upon the surface of the ground, and then covering the well-distributed seed by the use of a series of plows or shovels connected with the machine, which will, in covering it, leave the seed on a higher plane than in other methods, and form A-shaped ridges of earth above the rows of seed, and leave V-shaped furrows between the rows of grain, which serves more effectually to protect the seed from injury by water and ice.

My improvement may be readily attached to the common seed-drill by dispensing with the drill-teeth.

In the accompanying drawings, A A′ denote the side pieces and one of the front pieces of a common seed-drill frame. Underneath the cross-timber A′ drag-bars $a$ $b$ are hinged. To the rear ends of drag-bars $b$ are tubular metal grain-conductors $i$, having their lower ends provided with inclined lips, to clear the track or path for the seed, and these conductors are firmly secured to the bars $b$; and shovels $d$, having curved shanks, are pivoted between the drag-bars $a$ $a$, as represented in Figs. 1 and 2, and may be secured at the desired angle by means of wooden pins, which pass through their shanks and the drag-bars, between which they are pivoted. Each of the drag-bars $b$, and each pair of drag-bars $a$ $a$, are provided with adjusting-chains, in the usual manner of seed-drills. Flexible conducting-pipes $f$ lead from the seed-boxes (to be located at $g$) into the seed-distributers $i$, which, as above stated, may be provided with receding flanges or lips, to clear the surface of the ground upon which the seed will be dropped.

In Fig. 3, the lower end of the distributing seed-conductor $i'$ is represented as provided with two V-shaped cross-pieces, designed to cause the falling grain to be scattered upon the ground within the compass of the conductor's lower orifice, and a similar cross-piece may be secured in the center of conductor $i'$, as may be seen in this figure; but this distributer is not provided with the track-clearing flanges.

The distributing-conductors $i$ $i'$ will, when the machine is in use, be adjusted so that their lower ends will sweep along in contact with the surface of the ground, and remove any clods or other obstructions from the path in which the seed will be sown, and the shovels or plows $d$ will form a ridge of soil above the rows of grain as the machine advances.

It is apparent that this machine is capable of use as a cultivator for any kind of grain or vegetable sown in rows, and it may also be employed as a planter by the substitution of a dropping mechanism, which will drop the grain at suitable intervals.

The openings at the lower ends of the distributing-tubes may be oval-shaped or cylindrical, to sow the grain in wider or narrower rows, as may be desired.

The double drag-bars, between which the shovel-shanks are adjustably pivoted, diverge as they approach their hinges at the front of the machine, for the purpose of governing their work, and insuring the formation of the ridges of soil upon the rows of sown grain.

Having described my invention, I claim and desire to secure by Letters Patent—

In a grain-drill, the combination of the surface-sweeping grain-distributers with the ridge-forming covering-plows, substantially as and for the purpose herein specified.

In testimony whereof I have hereunto set my hand this 17th day of September, A. D. 1874.

JOSEPH R. SYMMES.

Witnesses:
    H. P. K. PECK,
    RICHARD BROWN.